United States Patent [19]
Cotton et al.

[11] Patent Number: 5,214,691
[45] Date of Patent: May 25, 1993

[54] KEY TELEPHONE SYSTEM WITH VIRTUAL PRIVATE LINES

[75] Inventors: John M. Cotton, East Norwalk; Neil C. Olsen, Milford, both of Conn.

[73] Assignee: IPC Information Systems, Inc., Stamford, Conn.

[21] Appl. No.: 766,648

[22] Filed: Sep. 26, 1991

[51] Int. Cl.[5] .............................................. H04M 1/26
[52] U.S. Cl. .................................. 379/157; 379/165; 379/171; 379/258; 379/268
[58] Field of Search ............... 379/157, 156, 158, 165, 379/167, 171, 258, 268

[56] References Cited

U.S. PATENT DOCUMENTS

| | | | |
|---|---|---|---|
| 4,173,713 | 11/1979 | Giesken et al. | |
| 4,201,889 | 5/1980 | Lawrence et al. | 320/68 |
| 4,201,891 | 5/1980 | Lawrence et al. | 370/58 |
| 4,317,962 | 3/1982 | Cox et al. | |
| 4,817,085 | 3/1989 | De Prycker | 370/60 |
| 4,903,260 | 2/1990 | Boettle et al. | 370/60 |
| 4,916,690 | 4/1990 | Barri | 370/60 |
| 4,958,369 | 9/1990 | Tsuchida | 379/157 |
| 4,998,275 | 3/1991 | Braunstein et al. | 379/164 |

FOREIGN PATENT DOCUMENTS

WO8804869 6/1988 PCT Int'l Appl.
WO8807297 9/1988 PCT Int'l Appl.
WO8911764 11/1989 PCT Int'l Appl.
WO9004316 4/1990 PCT Int'l Appl.

OTHER PUBLICATIONS

"Implementation of a 16 to 16 Switching Element for ATM Exchanges," by P. Barri et al., *IEEE Journal on Selected Areas in Communications*, vol. 9, No. 5, pp. 751-757 (Jun. 1991).

"Effects of Output Buffer Sharing on Buffer Requirements in an ATDM Packet Switch," by A. E. Eckberg et al., AT&T Bell Laboratories, Holmdel, N.J. 07733, pp. 459-465 (IEEE 1988).

"Metastability Behavior of CMOS ASIC Flip-Flops in Theory and Tests", by Jens U. Horstmann et al., *IEEE Journal of Solid-State Circuits*, vol. 24, No. 1, pp. 146-157 (Feb. 1989).

"Input v. Output Queueing on a Space-Division Packet Switch," by Mark J. Karol et al., *IEEE Global Telecommunications Conference*, Conference Record, vol. 2, Session 19.4, pp. 659-665 (Dec. 1986).

"Metastable Behavior in Digital Systems," by Lindsay Kleeman et al., *IEEE Design & Test of Computers*, pp. 4-19 (Dec. 1987).

"A Shared Buffer Memory Switch for an ATM Exchange," by Hiroshi Kuwahara et al., pp. 118-122 (IEEE 1989).

"System 12: Review of the Fundamental Concepts," by R. Van Malderen, *Electrical Communications*, vol. 59, No. 1/2, pp. 20-28 (1985).

"Large-Scale ATM Multistage Switching Network with Shared Buffer Memory Switches," by Yoshito Sakurai et al., *IEEE Communications*, vol. 29, No. 1, pp. 90-96 (Jan. 1991).

"The Behavior of Flip-Flops Used as Synchronizers and Prediction of Their Failure Rate," by Harry J. M. Veendrick, *IEEE Journal of Solid-State Circuits*, vol. 1 SC-15, No. 2, pp. 169-176 (Feb. 1989).

*Primary Examiner*—Stafford Schreyer

[57] ABSTRACT

A virtual private line key telephone system is provided. The system includes a console including a plurality of line keys each associated with a party that can be reached via a switched trunk line. A look-up table means associates the line keys with the telephone numbers of the associated parties. A communication path is established from the console to one of the trunk lines. Signals are sent to the central office via the selected trunk line corresponding to the telephone number in the look-up table means associated with a line key that is actuated to place a calls. The telephone number of incoming calls are determined and compared with telephone numbers in the look-up table. Thereafter the line keys which are associated with the incoming calls are determined. The incoming call is coupled to the console when a line key associated with the incoming caller is actuated.

8 Claims, 5 Drawing Sheets

Incoming Virtual Private Line Call

Outgoing Virtual Private Line Call

KEY TELEPHONE SYSTEM WITH VIRTUAL PRIVATE LINES

This invention relates to key telephone systems and, more particularly, to the large key telephones of the type used in the financial community referred to as trader turrets.

BACKGROUND OF THE INVENTION

In the financial community, securities and commodities are usually traded using a private line trading network between brokerage houses, banks, and other trading partners. A brokerage house, for example, typically has one or more trading rooms coupled to a large number of telephone lines, usually private lines, going to its trading partners. A trading room may include any number of trading stations each including a key telephone known as a "trader turret" which provides key line access to a large number of the incoming lines. A large trading room can easily trade securities and commodities at the rate of millions of dollars per second.

A typical trading transaction involves a rapid series of short telephone conversations to locate traders having the desired security for sale at the best price. A typical call lasts ten seconds and there may be on the order of five calls per minute during the course of a single transaction. Private line key telephone systems provide immediate access and are preferred for the rapid, multi-call communications involved in most financial transactions.

Manual dialing is much too slow and cumbersome to be seriously considered in the hectic environment of financial trading. Auto dial systems where a single key actuation sends dial tones or pulses to a central office switch are also too slow for most trading operations since dial pulse systems usually take about eighteen seconds to connect, whereas tone systems usually take about fourteen seconds to connect. Private lines provide the desired immediate communication, but are much more expensive than switched lines.

The trader turret work stations are specially designed to suit the needs of a financial trader. The line key assignments on the console are a personal matter and may change as market conditions change. Typically a trader will want the most frequently called trading partners to appear at a specific line key and at specific locations on the console so that, in most cases, it is not necessary to take time to read the legends associated with the keys. The console must indicate the line status for all lines available at the console so the trader can tell which lines are in-use, on hold, ringing, or free. The console must also indicate the active line at the console so that the trader can always confirm the identity of the trading partner on the line.

An auto-dial line is not compatible with normal trader turret operations. With a switched line the central office switch selects the first available trunk to the trading room which means that the call from a particular trading partner can come in on a number of different lines. As a result, the call can appear at different locations on the trader turret which is generally unacceptable to traders. In addition, as previously mentioned, auto-dial lines take too long to complete a connection.

SUMMARY OF THE INVENTION

An object of this invention is to provide a trader turret with virtual private lines, i.e. switched lines that appear to the trader as private lines.

Another object of the invention is to provide a less expensive trading network based at least in part upon the use of switched lines.

Most telephone service companies provide ISDN (Integrated Service Digital Network) which consists of lines suitable for data transmission that are switched at the central office. The central office ISDN switch responds to a burst of data identifying the party being called and the originating party. Normally, a connection is completed in less than two seconds. On incoming calls the central office switch provides the calling party identification (cpi), i.e., the telephone number of the calling party. Because of the short connection time specification, ISDN lines can be used in the hectic financial trading operation. The ISDN lines cannot match the speed of a private line, but are considerably less expensive and are satisfactory for many of the less active trading partners.

A separate key on the trader turret identifies each trading partner that can be reached on the ISDN network in the system according to the invention. A lookup table maintains the telephone number of each of these parties and associates each such number with a line key for the party. For outgoing calls this telephone number from the look-up table is sent to the central office as a burst of data when the key is actuated. The indicators associated with the ISDN party line keys at all consoles in the trading room emulate the private line indications.

Incoming calls from an ISDN party are more difficult to process since the calls come in on common trunk lines which are not unique for a particular trading partner as is the case with a private line. An incoming ISDN call, however, does supply a calling party identification (cpi) which identifies the caller and can be compared with the look-up table containing the numbers of the ISDN parties that the system is set up to receive. If a match is found, a ringing line indication appears at all consoles associated with the keys for the calling party. If a key is actuated, a path is completed from the incoming call trunk line to the trader turret at which the key was actuated and the indicators at the consoles are changed to indicate that the line is in-use.

The only difference observable by the trader between a private line and a virtual ISDN private line according to this invention is a slightly greater connection time for the outgoing virtual private line calls. The signalling at the console emulates a private line and therefore IDSN lines are satisfactory for many financial trading operations.

GENERAL DESCRIPTION OF THE DRAWINGS

The foregoing and other objects may be understood more fully from the following specification which sets forth an illustrative embodiment of the invention. The drawings are part of the specification wherein.

DETAILED DESCRIPTION OF THE INVENTION

Figure 1:
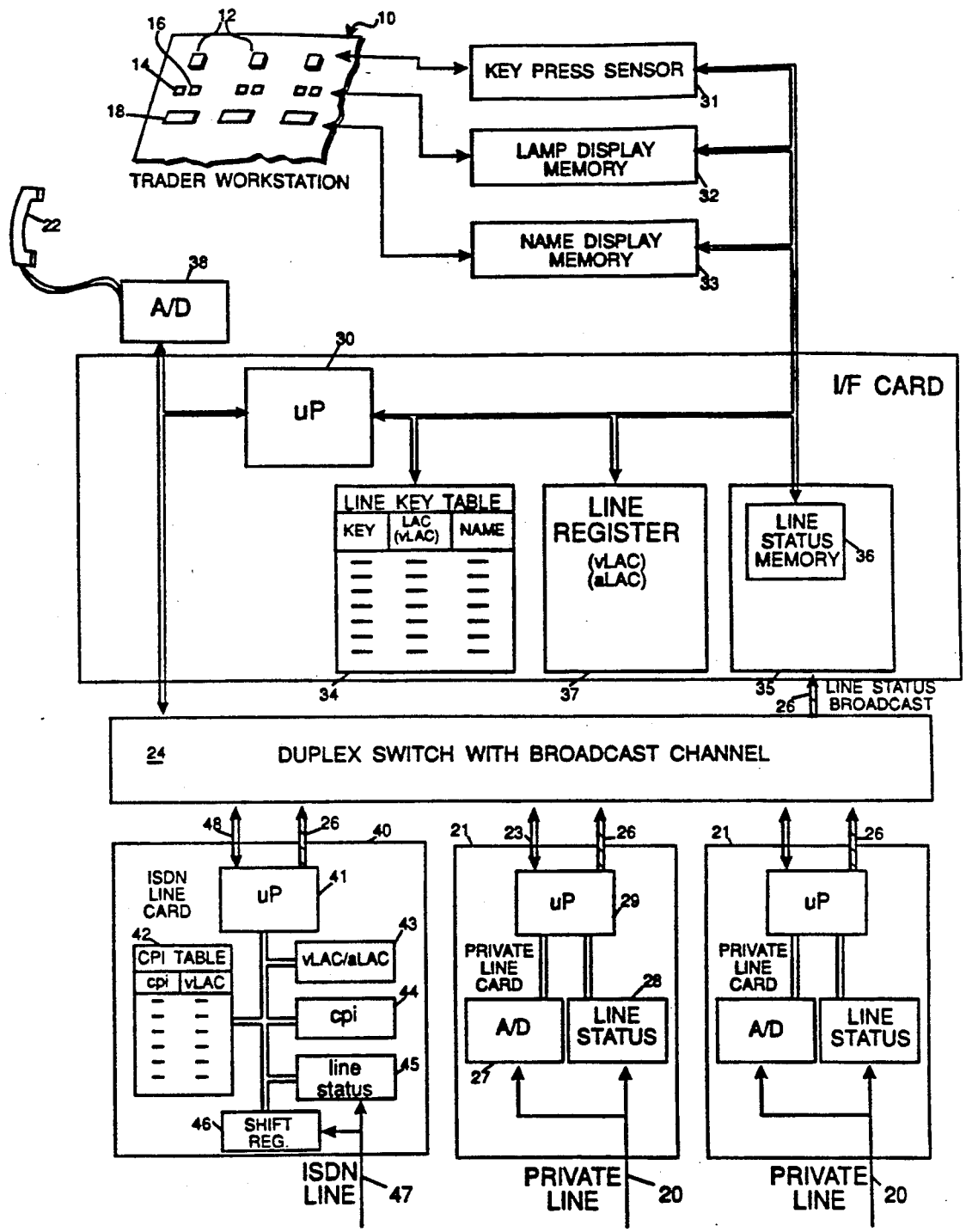
FIG. 1 is a block diagram of the overall system according to the invention.

FIG. 1 is an overall diagram illustrating the system according to the invention. A trading room includes any desired number of trader work stations 10 each including a large number of line keys 12. A typical trader work station will have at least thirty line keys and may have as many as several hundred line keys. In a normal installation, actuation of a line key establishes a talk path from a handset 22 at the work station to the associated private line 20 via a suitable switch 24.

Associated with each of the line keys at the work station is a pair of indicating lamps 14 and 16. Lamp 14 may be a green status indicator which indicates the line is busy by a steady on condition, the line is ringing by a rapid flashing, the line is on hold by a slow flashing, or the line is free by the off condition. The other lamp 16 of each pair has a different color, such as red or amber, and is used to indicate the active line that is in use at the station. Also associated with each line key is a name plate indicator 18 which is preferably an LCD display identifying the party associated with the line key.

Trader work station 10 is controlled by a microprocessor 30 which has access to a key press sensor 31, a lamp display memory 32, a name display memory 33, a line status memory 36, a line register 37, and a line key table 34. Key press sensor 31 detects when a line key is depressed so that when interrogated by the microprocessor, the sensor returns a digital code identifying the depressed key. The lamp display memory includes a memory bit for each indicator lamp 14 and 16 which control the on/off state of the respective lamps. The microprocessor periodically updates the lamp display memory according to the current line status and active line. The line status memory 36 includes data indicating the current status of all the lines in the trading network. Line key table 34 includes the data for the custom key set up for the work station giving for each key the associated logic address code (LAC) for the line to be connected when the key is depressed, and the name plate information for the key. Thus, the Line Key table associates the parties with specific line keys at specific locations on the console.

The microprocessor uses the line status information in memory 36 and the line key to line assignment information in table 34 to update the lamp display memory 32 so that the work station displays line status at the correct location on the console. The microprocessor updates the name display memory 33 according to the name assignments in table 34. With this arrangement the trader can have any line in the system appear at any desired line key with any desired name plate designation by the appropriate set up of table 34.

Handset 22 provides, and responds to, analog signals. The handset is therefore coupled to digital switch 24 via an analog to digital converter 38. Microprocessor 30 supplies commands to the switch for establishing a talk path to a line card selected by actuating a line key.

Each of the private lines 20 available to the network connects to switch 24 via a line card 21 constructed according to the specifications for the particular line. The line cards include conventional line status circuits 28 which detect the status of the line, that is, busy, ringing, hold, or free. The line status circuits pass on digital signals indicating status to microprocessor 29 in the line card which, in turn, supplies the information to all the line status memories 36 at the turret work stations via a broadcast channel 26. Preferably, only changes in line status are broadcast to thereby reduce the traffic on the broadcast channel. With such an arrangement, the interface card 35 at the work station must decode the line status change information received from the broadcast channel and update the line status memory 36 accordingly.

If the private line is of the analog type, the signal is passed through an analog to digital conversion and then to microprocessor 29 for routing to a particular handset at a work station via switch 24.

Switch 24 is preferably a duplex digital switch including a broadcast channel of the type described in application Ser. No. 07/766,047, entitled "Distributed Control Switching Network for Multi-line Telephone Communication" filed concurrently herewith. This switch is modular with each switch element being controlled by separate processors. A typical switch element includes 19 input ports and 19 output ports with 32 channels per port. For routing through the switch, each destination is given a unique logic address code (LAC). A route is selected by supplying the switch with a "path set" command and the destination LAC. When a switch element receives a "path set", command it interprets the LAC and sets a path through the switch element toward the destination LAC. To permit unlimited conferencing, a talk path is established by first connecting the work station to a bridge and then establishing the route from the line card back to that bridge.

The preferred switch also includes a dedicated broadcast channel in each switch element. Preferably each switch element includes a first-in, first-out (FIFO) stack for received broadcast messages so that multiple broadcast messages can be prioritized when passing through a switch.

For selection of a private line, the operator locates a line that is free or ringing and depresses the appropriate line key. The microprocessor looks up the LAC for the line corresponding to the depressed key in line table 34. A path set command is issued to switch 24 to establish a path between handset 22 and the appropriate private line card 21. When the connection is established, line status circuit 28 detects the change of status to busy and broadcasts this status change to all the line status memories 36 in the network. Work station microprocessor 30, using table 34, changes the status and active line indicators associated with the depressed key.

The purpose of this invention is to provide switched line capability that emulates private line operation at the trader work station. In particular, it is important that the switched line party always appear at the same location on the console and always be associated with the same line key regardless of which switched line is used for the call.

Although ISDN switched data lines are preferred because of their high operating speeds, other types of switched lines could also be used provided caller identification is provided on incoming calls. Also systems similar to ISDN in other countries, such as Digital Access Signalling (DAS) in the United Kingdom, can also be used. The ISDN protocols are set forth, for example, in ISDN Protocols for Connection Control by Harmon and Newman, 1989 IEEE. Basically, ISDN lines provide data in packets including a header giving the calling party identifier (cpi). The ISDN line card 40 must be designed in accordance with the ISDN protocol.

Line card 40 includes line status circuits 45 which determine the status of ISDN line 47 and supply the status information to a microprocessor 41. Since the incoming data is in a serial format, it is supplied to a shift register for conversion to a parallel format supplied to the microprocessor. The microprocessor is programmed to extract the calling party identifier (cpi) from the incoming data and stores this information in a cpi register 44.

The ISDN line card includes a CPI Table (look-up table) 42 accessible to the microprocessor. The table includes all the cpi telephone numbers that the system will recognize and the associated virtual logic address codes (vLAC). The VLAC is a dummy address code used to identify a party available on an ISDN line as though it were a private line party. A VLAC serves to identify a line key associated with an ISDN party rather than the line to that party. For incoming calls, the CPI Table is used to convert the cpi into a VLAC so that line status indications appear at the appropriate locations on the consoles associated with the particular line key and calling party. For outgoing calls, the CPI Table is used to connect the VLAC message into the telephone number to be called. In actual practice, the use of separate look-up tables for incoming and outgoing calls would usually be preferable.

The ISDN line card also includes a VLAC/aLAC register 43 for associating the ISDN party with the actual LAC of the ISDN line card. Microprocessor 41 is coupled to switch 24 via the broadcast channel 26 and a data channel 48.

For virtual private line communication, a line register 37 is added to the memory accessible to microprocessor 30 for storing the VLAC/ALAC association for a call which is the same as that in register 43. For the virtual private line keys, the VLAC for the virtual party is inserted in LINE KEY table 34 instead of the LAC identifying an actual line.

With this arrangement, line status information is broadcast to the trader work station according to the VLAC and is therefore displayed on the console at the first location associated with the ISDN party rather than with the line being used. When a talk path is established, the talk path is from the work station to the ISDN line (ALAC) associated with the virtual party (VLAC).

Figure 2:
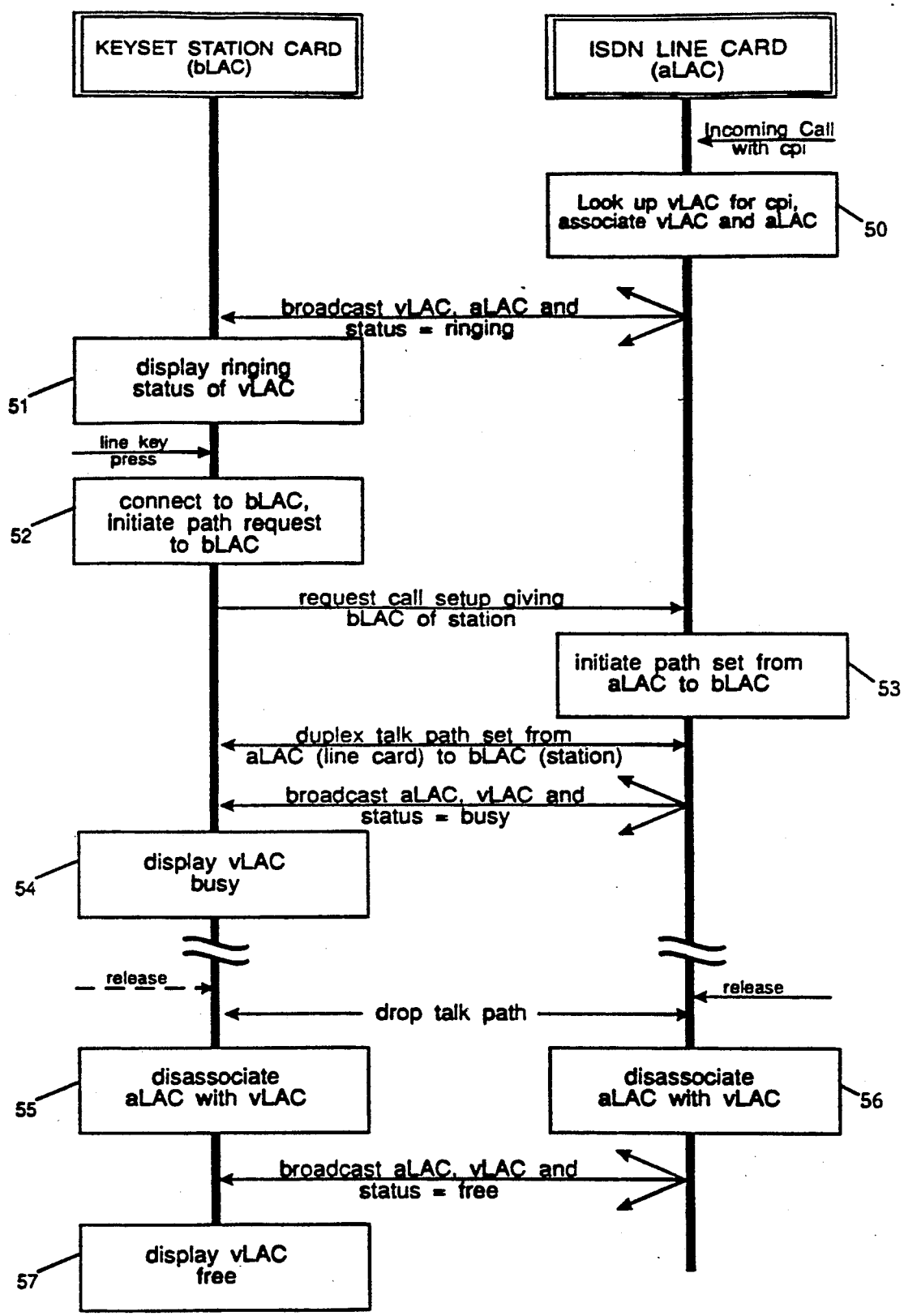
FIG. 2 is a time line diagram of events in setting up an incoming virtual private line call.

FIG. 2 is a time line diagram illustrating the events taking place in the ISDN line card (located at ALAC) and at the work station card (bLAC), as well the communication between these cards.

The time sequence working from top to bottom in the diagram commences at the line card with detection of an incoming call which includes a calling party identification (cpi). In step 50 of FIG. 2 the line card processor looks up the VLAC corresponding to the cpi of the incoming call from the CPI Table 42 and associates the VLAC and ALAC in register 43 (FIG. 1). The line card next broadcasts the VLAC and ALAC and indicates the status thereof as "ringing". The broadcast information is conveyed to all of the trader work stations and the line status memory 36 at the work station is updated accordingly. In step 51, at the work station card, the lamp display is updated to indicate the status as ringing for the line key corresponding to the VLAC. This ringing signal identifies the calling party on the ISDN line rather than the calling private line as is normally the case.

If the operator decides to pick up the ringing line by depressing the corresponding line key, the work station card connects the talk path to the associated bridge (BLAC) and initiates a "path-set" request to the BLAC. The call request is sent to the ALAC line card which then prepares instructions in step 53 to initiate a "path set" form the line card (ALAC) to the work station (BLAC). Switch 24 (FIG. 1) then establishes a duplex talk path from the line card (ALAC) to the work station bridge (BLAC). The line card also sends out a status broadcast identifying the ALAC, the VLAC and the status as "busy". The broadcast information is received by all work stations which update the local line status memory and, in step 54, display the indicator lamps corresponding to the VLAC as "busy". At his point the communication has been established between the calling party and the work station hand set, and the line key for the calling part is indicated as "busy" at all of the work stations which access that party.

When a call is completed, a release can be initiated either by the calling party or the operator of the work station. In either event a command is sent to the switch to "drop" the talk path. In steps 55 and 56 the work station and the line card both disassociate the ALAC from the VLAC and the line card thereafter broadcasts the ALAC, the VLAC, and their status as "free". In step 57 the operation is completed by a display at the work station of the indicator light associated with the VLAC line key as "free".

Figure 3:
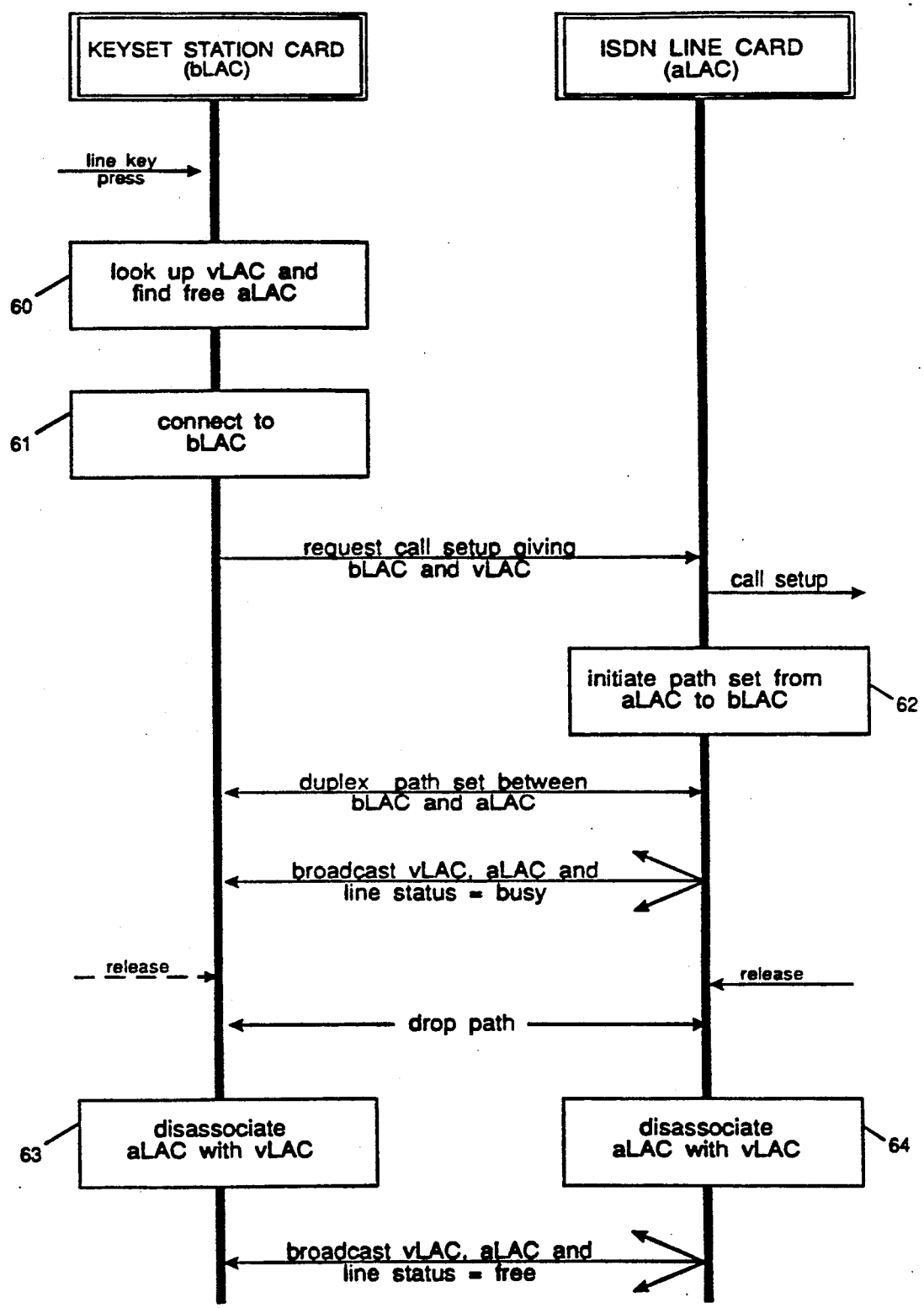
FIG. 3 is a time line diagram of events in setting up an outgoing virtual private line call.

FIG. 3 is a similar time line diagram for the events which take place in an ongoing virtual private line call. In this case the initial step is a line key press at the work station when the operator wishes to place a call to one of the ISDN parties. When the key is depressed, the microprocessor in the work station looks up the VLAC in Table 34 corresponding to the depressed line key and also looks up a free ISDN line (ALAC) in status memory 36. In step 61 the work station is then connected to the associated bridge (BLAC). A request for a call set up giving the BLAC address is then sent to the ISDN line card corresponding to the selected ALAC. The line card looks up the called party identification (cpi) corresponding to the VLAC and sets up the call with central office switching. In step 62 the line card then initiates a "path set" from the ALAC back to the BLAC and establishes a duplex communication therebetween via switch 24 (FIG. 1). The line card next will broadcast the VLAC, the ALAC, and the line status as "busy".

When the call is terminated, either by release at the work station or a release at the line card, the path through the switch is dropped and the ALAC and VLAC are disassociated in steps 63 and 64. Finally, the line card sends out a broadcast of the VLAC, the ALAC and indicates the line status as being "free".

Figure 4:
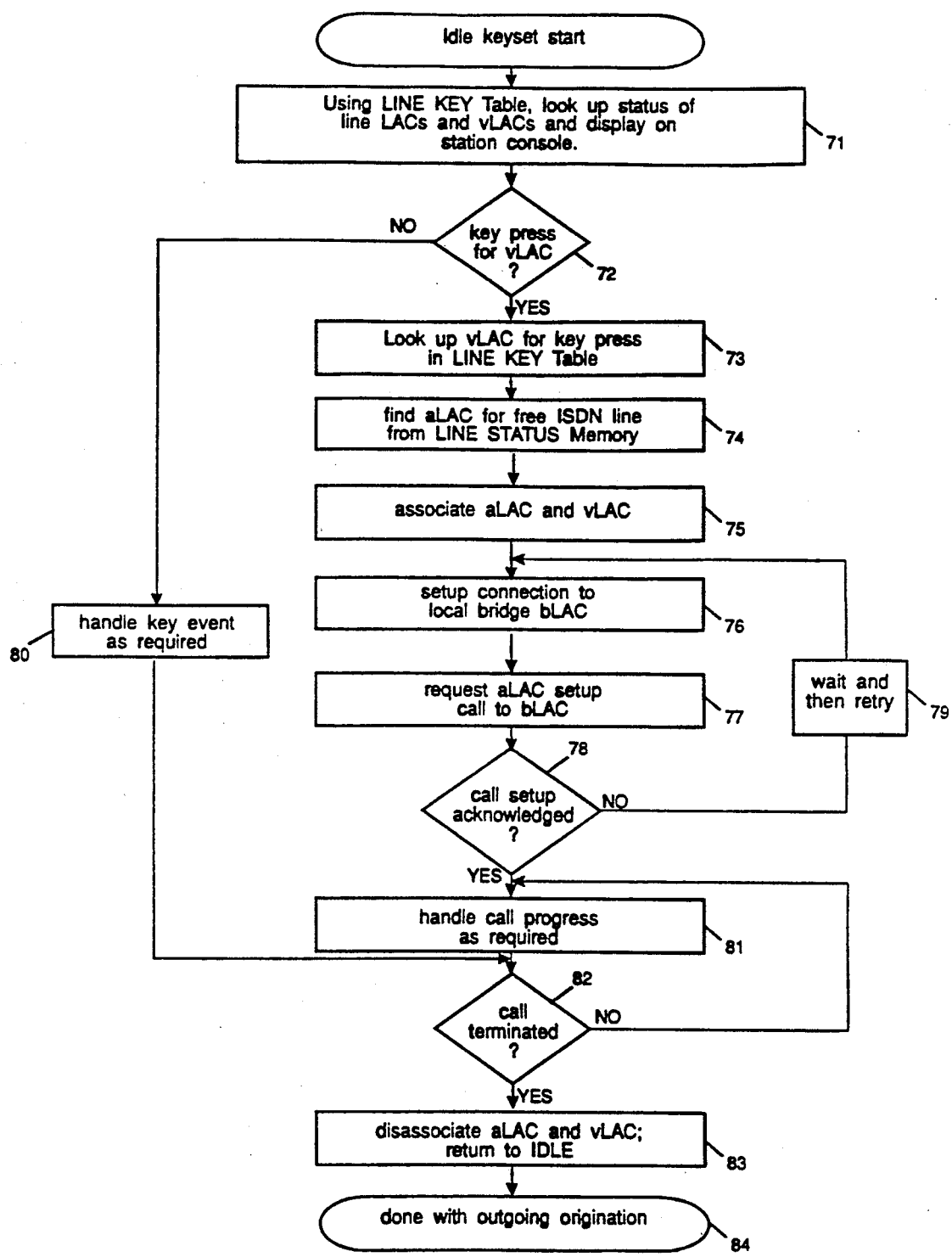
FIG. 4 is a flow diagram of the program at the trader work station.

The flow diagram for the microprocessor program at the work station is illustrated in FIG. 4. The program begins with step 71 which is a look-up of the status of line LACs and vLACs for display on the station consoles. The program also periodically interrogates the key press sensor to determine if a line key has been pressed corresponding to a virtual private line (VLAC). If the answer in decision 72 is "no", the program proceeds to handle other line events as required. If decision 72 indicates that a key has been depressed corresponding to a virtual private line party, the processor in step 73 looks up the VLAC number for the depressed key in the Line Key Table. The processor then looks up a free ISDN line (ALAC) in the line status memory 36. The ALAC and VLAC are then associated and stored in line register 37. In step 76 the processor next sets up a connection to the local bridge (BLAC) and in step 77 sends out a request to the ALAC line card to set up a path back to the bridge (BLAC). The program then monitors acknowledgements to determine if the call set up has been received by the line card. If not, the program waits in step 79 and then repeats steps 76 and 77 attempting to again set up the call back to the bridge (BLAC). When the call set up has been acknowledged, the program proceeds to step 81 which handles the call progressing as required. The program periodically checks to determine if the call has been terminated and, if not, repeats step 81. When the call is terminated, as indicated by decision 82, the program proceeds in step 83 to disassociate the ALAC from the VLAC and then returns to the idle condition.

Figure 5:
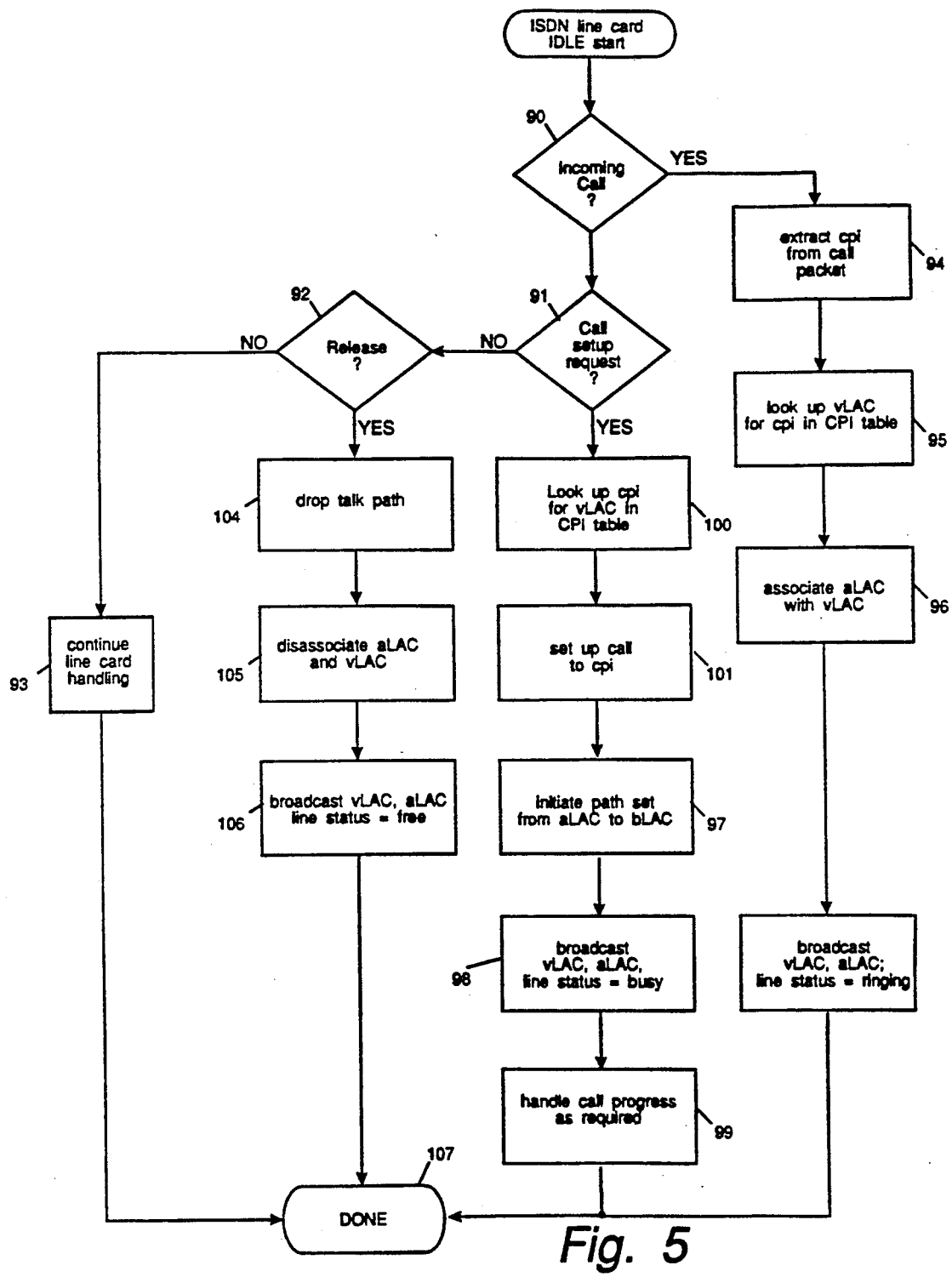
FIG. 5 is a flow diagram of the program at the ISDN line card.

FIG. 5 is a flow diagram for the program in the ISDN line card. In this program the processor proceeds through inquiries 90-92 to determine, successively, whether there is an incoming call, a call set-up request, or a release. If all decisions are negative, the program proceeds to step 93 where it continues line card handling.

If decision 90 indicates that an incoming call is present, the program proceeds to step 94 which extracts the calling party identification (cpi) from the incoming call packet. The processor in step 95 then looks up the VLAC corresponding to that cpi in the CPI table. In step 96 the ALAC is associated with the VLAC and in step 102 broadcasts the VLAC, the ALAC, and line status as "ringing". If a call set up request is present at the time of decision 91 (either as a new call or in response to a "running" indication), the program proceeds to look up the cpi for the VLAC in the CPI table in step 100 and sets up a call to the called party corresponding to the cpi in step 101. Thereafter, the program proceeds to initiate the path set up and broadcasts the line status in steps 97 and 98.

If a release is detected in decision 92, the program proceeds to drop the talk path in step 104 and disassociates the ALAC from the VLAC in step 105. Thereafter, the processor is step 106 broadcasts that the VLAC and ALAC line status is "free".

While only one illustrative embodiment of the structure and methods has been described in detail, it should be obvious that there are numerous variations within the scope of the invention. The invention is more particularly defined in the appended claims.

We claim:

1. A virtual private line key telephone system comprising:
    a console including a plurality of line keys each associated with a party that can be reached via a switched trunk line;
    a look-up table means associating said line keys with the telephone numbers of the associated parties;
    means for establishing a communication path from said console to one of said trunk lines and sending signals to the central office via said selected trunk line corresponding to the telephone number in said look-up table means associated with a line key that is actuated to place a call;
    means for determining the telephone number of incoming calls and comparing said incoming call telephone number with telephone numbers in said look-up table means to determine which line keys are associated with the incoming call; and
    means coupling the incoming call to the console when a line key associated with the incoming caller is actuated.

2. The telephone system according to claim 1 wherein each of said line keys includes a status indication which emulates private line status indications.

3. The telephone system according to claim 1 wherein each of said line keys includes a status indication where the status of a call to a party is indicated at a fixed location associated with a particular line key regardless of which trunk line is used for he call.

4. The telephone system according to claim 1 wherein, said line keys are located at a plurality of consoles,
    said trunk lines are each associated with a line card capable of detecting line status, and said look-up table means includes
        a look-up tale at said console for associating line keys to virtual logic address codes, and
        a look-up table at said line card for associating virtual logic address codes with said numbers of associated parties.

5. The telephone system according to claim 4 wherein the status of the calls to associated parties is displayed at said console for said line keys as though the lien key were associated with a private line.

6. A virtual private line key telephone system comprising:
    at least one console including a plurality of assignable line keys;
    a line key assignment look-up table for said console for associating specific line keys to parties that can be reached via a switched trunk line and a virtual logic address code;
    at least one lie card for a switched trunk line which can connect to multiple parties via a central office switch and which provides calling party identification (cpi) on incoming call;
    a cpi look-up table for associating calling party identification telephone numbers with virtual logic address codes;
    means for placing an outgoing call on said switched lien by actuating a line key, looking up the virtual logic address code associated with the line key and party, and looking up the calling party identification telephone number corresponding to the virtual logic address code and automatically placing a call to said telephone number; and
    mean for receiving incoming calls on said switched line by detecting the calling party identification (cpi), looking up the associated virtual logic address code, displaying status of the calling party as ringing, and connecting the trunk line to a console on which a line key corresponding to the calling party is actuated.

7. A method of making and receiving telephone calls on a multi-party key telephone system using switched lines including line keys at operator consoles and line cards at outside line terminations including the steps of:
    maintaining in memory the association between line keys and telephone numbers of parties that can be called or from whom calls can be received;
    receiving telephone calls by
        determining the caller telephone number, determining which line keys are associated with said caller telephone number and indicating the line status as "ringing", connecting the line card for the incoming call to the console at which a line key associated with the calling party is actuated, and making telephone calls by determining the telephone number of the party to be called associated with an actuated line key automatically dialing said telephone number associated with an actuated line key, and connecting the line card used for said call to the console at which the line key was actuated.

8. A method of making and receiving telephone calls on a multi-party key telephone system using switched lines wherein said system includes line keys at consoles and trunk lines connected to line cards, maintaining a look-up table associating line keys with address codes associated with parties that may be called, maintaining a look-up table associating address codes and telephone numbers for parties that may be called, placing outgoing calls by actuating a key corresponding to the party to be called looking up the address code and corresponding telephone number of the party corresponding to the actuated key and automatically placing a call to said corresponding telephone number; and receiving telephone calls determining the caller telephone number, looking up the address code associated with said caller telephone number, indicating "ringing" by the caller, connecting the incoming line to the console where a line key is actuated corresponding to said address code of said caller.

* * * * *

UNITED STATES PATENT AND TRADEMARK OFFICE
CERTIFICATE OF CORRECTION

PATENT NO. : 5,214,691

DATED : May 25, 1993

INVENTOR(S) : John M. Cotton, et al.

It is certified that error appears in the above-identified patent and that said Letters Patent is hereby corrected as shown below:

COLUMN 8

Claim 3, line 13, after the word "for", change "he" to --the--.

Claim 4, line 14, change "The" to --A--.

Claim 5, line 29, change "lien" to --line--.

Claim 6, line 38, after the word "one", change "lie" to --line--.

Claim 6, line 46, change "lien" to --line--.

Claim 6, line 52, change "mean" to --means--.

Signed and Sealed this

Eleventh Day of January, 1994

Attest:

BRUCE LEHMAN

*Attesting Officer*   *Commissioner of Patents and Trademarks*